United States Patent [19]

Burgdorf

[11] Patent Number: 5,195,809
[45] Date of Patent: Mar. 23, 1993

[54] HYDRAULIC BRAKE SYSTEM WITH DEVICES FOR CONTROLLING BOTH BRAKE SLIP AND TRACTION SLIP

[75] Inventor: Jochen Burgdorf, Offenbach-Rumpenheim, Fed. Rep. of Germany

[73] Assignee: Alfred Teves GmbH, Frankfurt Am Main, Fed. Rep. of Germany

[21] Appl. No.: 832,291

[22] Filed: Feb. 7, 1992

[30] Foreign Application Priority Data

Feb. 11, 1991 [DE] Fed. Rep. of Germany ........ 4104069

[51] Int. Cl.$^5$ .............................................. B60T 8/32
[52] U.S. Cl. ........................ 303/113 TR; 303/115 PP; 303/116 SP; 303/DIG. 6
[58] Field of Search ........ 303/113 TR, 113 R, 10-12, 303/14, 113 TB, 115 R, 115 PP, 116 R, 116 SP, 116 WP, 116 PC, 119 R, 119 SV, DIG. 6, 115 VM, 92; 180/197; 188/181 A, 181 R

[56] References Cited

U.S. PATENT DOCUMENTS

| | | | |
|---|---|---|---|
| 3,532,391 | 10/1970 | Kleih | 303/116 R |
| 3,608,984 | 9/1971 | Skoyler | 303/115 PP |
| 4,453,782 | 6/1984 | Arikawa et al. | 303/116 R |
| 4,618,189 | 10/1986 | Nakanishi et al. | 303/119 R |
| 4,703,979 | 11/1987 | Nakanish . | |
| 4,846,532 | 7/1989 | Friedow et al. | 303/115 VM |
| 4,964,681 | 10/1990 | Burgdorf et al. | 303/115 PP |
| 4,971,400 | 11/1990 | Jonner | 303/113 TR |
| 5,015,043 | 5/1991 | Resch | 303/92 X |
| 5,026,124 | 6/1991 | Resch | 303/116 R X |
| 5,078,458 | 1/1992 | Budecker et al. | 303/116 PC |
| 5,094,511 | 3/1992 | Becker et al. | 303/115 PP |

FOREIGN PATENT DOCUMENTS

| | | |
|---|---|---|
| 3006771 | 8/1980 | Fed. Rep. of Germany . |
| 3712053 | 10/1987 | Fed. Rep. of Germany . |
| 3740516 | 6/1989 | Fed. Rep. of Germany . |
| 3800854 | 7/1989 | Fed. Rep. of Germany . |
| 3900851 | 1/1990 | Fed. Rep. of Germany . |
| 3832023 | 3/1990 | Fed. Rep. of Germany . |
| 3927886 | 4/1990 | Fed. Rep. of Germany . |
| 4000837 | 7/1991 | Fed. Rep. of Germany . |
| 0004658 | 1/1983 | Japan ........................... 303/115 PP |
| 0182152 | 7/1989 | Japan ........................... 303/116 R |
| 9105689 | 5/1991 | World Int. Prop. O. .... 303/116 SP |

*Primary Examiner*—Douglas C. Butler
*Attorney, Agent, or Firm*—Robert P. Seitter; J. Gordon Lewis

[57] ABSTRACT

An anti-slip brake, traction slip control (TSC) brake system is described for normally isolating the master cylinder from the output of a pump activated during anti slip brake control. The brake line is furnished with a non-return valve prevents pump pressure from being communicated to the master cylinder except when a high-pressure accumulator is fully charged by the pump, causing the non-return valve to be opened. A self priming pump is utilized having a pump chamber initially defining a flow path from the master cylinder to the brake line. The wheel brakes communicate via an outlet valve and a return line with the pump chamber, while an interposed second suction valve is provided in the return line, having an opening pressure in excess of 1 bar. Brake shunt lines connect each of the wheel brakes with the master brake cylinder, via a TSC-valve, closed during traction slip control.

12 Claims, 1 Drawing Sheet

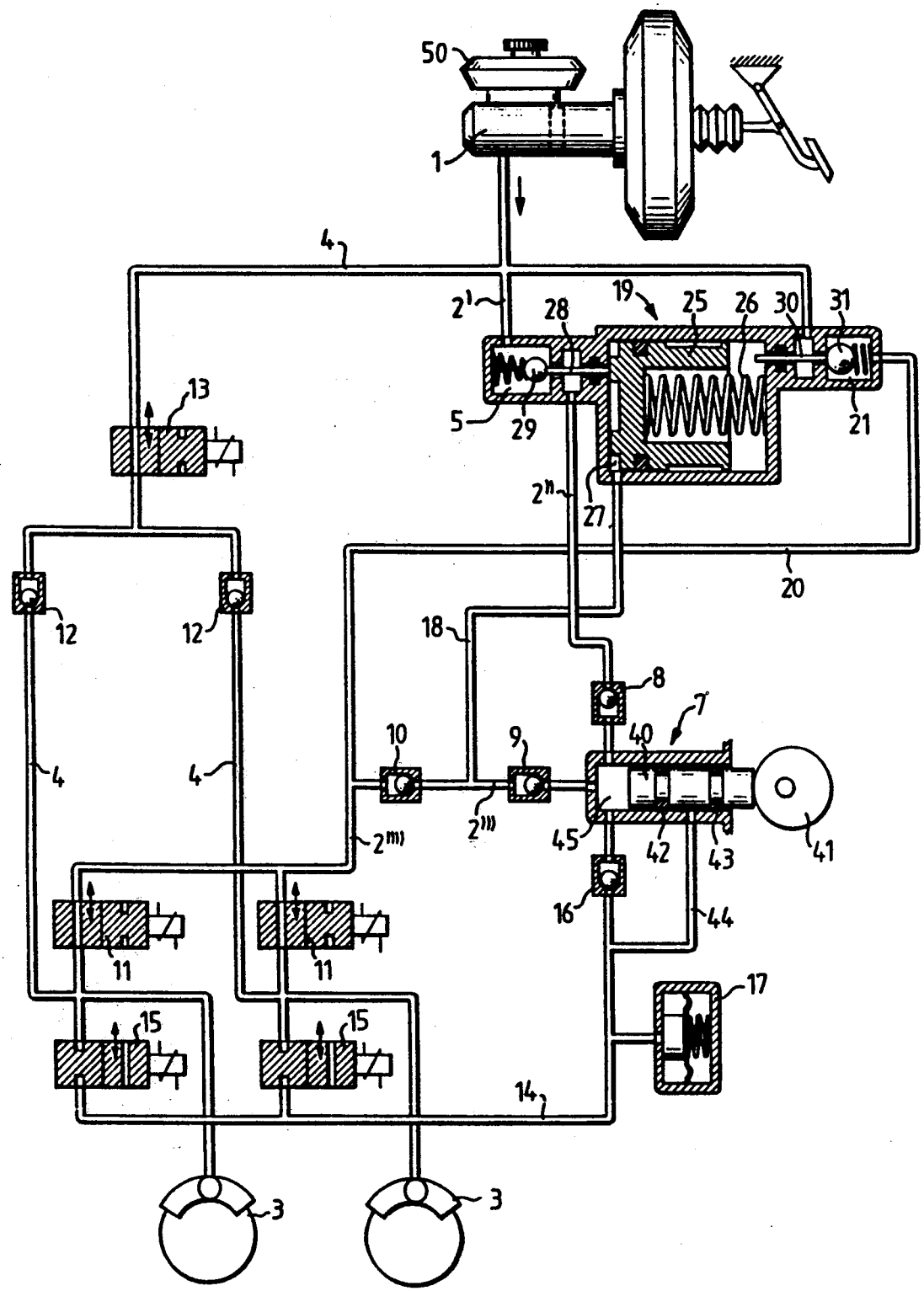

HYDRAULIC BRAKE SYSTEM WITH DEVICES FOR CONTROLLING BOTH BRAKE SLIP AND TRACTION SLIP

BACKGROUND OF THE INVENTION

The present invention relates to a brake system which is capable of controlling both brake slip and traction slip.

Systems are known wherein a separating valve is provided in the brake line between the master brake cylinder and the wheel brake. To reduce the pressure in the wheel brake, fluid is drawn out of the wheel brake by a pump into a high-pressure accumulator. The accumulated fluid under pressure is returned to the wheel brake for the purpose of renewed pressure build-up.

Further, systems are known wherein a reversible pump is arranged in the brake line, and depending on the direction in which the pump is delivering, the pressure in the wheel brake can be decreased or increased.

Systems are also known which perform brake slip control that also are used for preventing slipping of the wheels when starting to drive.

It is the object of the present invention to provide a brake system in which the master cylinder is separated from the brake circuit during a brake slip control in which, only one pump is required, operated both for brake slip control and traction slip control, and which is of a closed circuit type in order that braking pressure can still be built up in the brake circuit despite failure of a valve.

It is a further object to minimize the size of the high-pressure accumulator.

SUMMARY OF THE INVENTION

These objects are achieved by a brake system. which includes a high pressure accumulator connected to be charged by the output of a pump energized during antislip control by displacement of an accumulator piston. A controllably operated non-return valve isolates the master cylinder from the pump output pressure until the accumulator becomes fully charged. The accumulator piston then opens the non-return valve to allow communication between the pump and master cylinder, to thus isolate the pump from the master cylinder at all other times.

The master cylinder brake line initially is connected to the wheel brakes through a separating valve and the pumping chamber until the accumulator piston is displaced, the separating valve then operated to close that mode of connection, the master cylinder then connected to the wheel brakes via the non-return valve.

The wheel brakes are connected to the pump chamber via a return line opened when the control opens outlet valves, a low pressure accumulator also receiving the outflow from the wheel brakes. A pressure opened valve interposed in the return line maintains a residual pressure in the wheel brakes when pressure is reduced by the antislip control, and a self priming, double sealed piston pump is used to allow closing of the suction part in this instance.

A shunt line allows direct outflow from the wheel brakes when the master cylinder pressure is relaxed.

DESCRIPTION OF THE DRAWINGS

The FIGURE is a diagrammatic representation of a brake system according to the present invention.

DETAILED DESCRIPTION

The brake system is composed of a master brake cylinder 1 to which wheel brakes 3 are connected via a brake line 2. This brake line is composed of line portions 2' to 2''''. A shunt brake line 4 is provided in parallel to the brake line 2.

The first brake line portion 2' extends from the master brake cylinder to a separating valve 5. The second brake line portion 2'' extends from the separating valve to the pump 7. Brake line portion 2'' connects to a first one way acting suction valve 8 of the pump 7. This suction valve 8 has an opening pressure as small as possible, i.e , approximately 0.2 bar. Via an oppositely one way acting pressure valve 9, the brake line portion 2''' connects to the pump, leading to a one way acting non-return valve 10 closing towards the pump 7. The last line portion 2'''' leads from non-return valve 10 to the connected wheel brakes 3.

In the embodiment shown, the brake line portion 2'''' branches into two partial branches each having an inlet valve 11. The brake line 2'''' is open in the initial open position of the inlet valves 11, while it is closed in the closed switched condition thereof. The inlet valves 11 are operated electromagnetically by the antislip control.

As mentioned before, the wheel brakes 3 are in direct communication with the master brake cylinder via a shunt brake line 4. The partial branch lines of the shunt 4 leading to each wheel brake each contain a non-return valve 12 closing towards the wheel brake 3. A TSC-valve 13 having likewise two positions is inserted in the common line portion of the shunt brake line 4, open in the initial position, and closed in the switched position. TSC means traction slip control. The TSC valve 13 is only necessary if the wheels pertaining to the wheel brakes 3 are driven wheels. Its purpose will be described hereinbelow.

Further, the wheel brakes 3 are in communication with the pump 7 via a return line 14. Inserted in the branch lines of the return line 14 leading to the respective wheel brakes 3 is an outlet valve 15 which closes the respective branch line when in its initial position and which opens the respective line in its switched position. The outlet valves 15 are operated electromagnetically.

The return line 14 connects the wheel brakes 3 to the pump 7 via a second one way acting suction valve 16. The second suction valve 16 is characterized by its opening pressure being in excess of 1 bar. The minimum pressure in the return line 14 and hence in the wheel brake 3 is thus 1 bar.

A low-pressure accumulator 17 is interposed in the return line 14 and receives fluid under pressure which cannot be at once delivered to the master cylinder 1 and supply reservoir 50 due to a limited delivery capacity of the pump 7.

A pressure line 18 branches off from the brake line portion 2''' to lead to a high-pressure accumulator 19. A removal line 20 is provided furthermore which branches off from the brake line portion 2'''' in the area between the non-return valve 10 and the inlet valve 11. It leads to the master brake cylinder 1 and contains a controllable openable non-return valve 21 which closes towards the master brake cylinder.

The high-pressure accumulator 19 is designed as follows An accumulator piston 25 is loaded by a bias spring 26 and the face thereof defining in part the accumulator chamber 27.

The accumulator piston 25 actuates both the separating valve 5 and the controllably openable non-return valve 21. In its initial position, the accumulator chamber 27 is at its smallest volume and the accumulator piston 25 abuts on a tappet 28 which coacts with the closure element 29 of the separating valve 5 such that the closure element 29 is held spaced from its sealing seat. The separating valve 5 is thus held open. Once the high-pressure accumulator 19 begins to be filled, the accumulator piston 25 moves to the right and releases the tappet 28 so that the closure element 29 is permitted to seat on its sealing seat and closes the brake line 2.

When the accumulator 19 is being charged with the pump 7 during a brake slip control operation, the accumulator piston 25 displaces in opposition to the force of the accumulator spring 26. At a predetermined point, the accumulator piston 25 moves into abutment on another tappet 30 which cooperates with the closure element 31 of the controllably openable non-return valve 21/ The tappet 30 lifts the closure element 31 from its valve seat so that the removal line 20 will be opened to directly connect the master cylinder 1 to the wheel brakes 3.

Pump 7 is composed of a piston 40 driven by a rotated eccentric 41. Piston 40 defines in part the pump chamber 45. The pump piston is equipped with two seals 42 and 43, the intermediate area between the seals being in constant communication with the low-pressure accumulator 17 via a line 44. The pump chamber 45 has three ports, leading to the two suction valves 8 and 16 and to the pressure valve 9. The pump is a self-priming pump, and it is ensured by corresponding means that the piston 40 always remains in abutment on the eccentric 41. The piston 40 is thus forced to follow the movement of the eccentric 41.

It is noted that only one brake circuit is illustrated in the FIGURE. However, normally a master cylinder of tandem-type design is used, wherein one brake circuit each is connected to each chamber of this master cylinder in the illustrated fashion. As mentioned before, the TSC-valve 13 is required only in that circuit to which the driven wheels are allotted.

A distinction can be made between the three functions of the system, i.e., normal braking operation, brake-slip controlled braking operation, and traction-slip controlled braking operation.

The basic situation of the system is depicted by the FIGURE. The inlet valves 11 are open, the outlet valves 15 are closed, and the TSC-valve 13 is open. The pump 7 is not driven, the accumulator 19 is in its initial position so that the separating valve 5 is open and the releasable non-return valve 21 is closed.

Normal braking operation:

When the driver depresses the pedal, pressure fluid is supplied out of the master brake cylinder 1 via the open separating valve 5, via the first suction valve 8, the pump chamber 45, the pressure valve 9, the non-return valve 10 and the open inlet valves 11 into the wheel brakes 3. Braking pressure is thus built up in the brake circuit. This pressure results in wheel deceleration and consequently in vehicle deceleration. Once the pedal is released fluid flows via the brake shunt line 4, the opening non-return valves 12 and via the TSC-valve 13, back into the master brake cylinder 1.

The bias of the spring 26 in the high-pressure accumulator 19 is to conform to a brake circuit pressure which is less than the pressure which would in any case result in locking of the wheels.

Once this limit pressure is exceeded, the accumulator piston 25 will be displaced sufficiently so that the separating valve 5 closes. Further pressure build-up in the wheel brakes 3 now takes place via the controllably openable non-return valve 21 opening in the direction of the wheel brakes 3. The non-return valve 10 prevents any further fluid flow to the high-pressure accumulator 19.

The rotational behavior of the wheels is monitored during a braking operation by means of sensors not shown herein. The sensor signals are analyzed by a control unit which is likewise not shown. When it is determined by the control unit that any one of the wheels tends to lock, braking with brake slip control will commence.

During brake-slip controlled braking operation, the control unit first issues a switching signal to the respective inlet valve 11 to assume its closed position. Simultaneously, the respective outlet valve 15 is being opened by a corresponding control signal of the control unit. Further, the control circuit causes activation of the pump drive 41 so that the pump 7 starts to deliver. The TSC-valve 13 remains open.

Fluid returning from the wheel brakes 3 first flows into the low-pressure accumulator 17 whereby the braking pressure is reduced. The pump 7 takes in pressure fluid through the second suction valve 16 and delivers it into the accumulator chamber 27 of the high-pressure accumulator 19. The accumulator piston 25 thereof will be displaced so that the separating valve 5 closes.

Renewed pressure increase in the wheel brakes 3 is accomplished in that the associated outlet valve 15 closes and the associated inlet valve 11 opens. As a result, pressure fluid flows out of the high-pressure accumulator 19 into the wheel brake 3. The pressure in the wheel brake 3 is limited by means of the non-return valves 12 to the master cylinder pressure so that the driver can at any time interrupt the braking operation reduce the braking pressure by release of the pedal.

The opening pressure of 1 bar of the second suction valve 16 causes a small residual pressure to always remain in the wheel brake 3, which is necessary to keep the clamping elements just about in abutment with the brake disc and, respectively, with the brake shoes. Because of the increased opening pressure of the second suction valve 16, a vacuum may form in the pump chamber 45 which normally is not desirable since air can enter the system. Yet the double seal 42, 43 will reliably prevent this occurrence.

It may occur in special situations, for instance in the event of rapidly changing friction conditions on the road surface, that the high-pressure accumulator 19 is not able to completely accept the pressure fluid volume of the wheel brake 3, i.e., upon reaching a position where the non-return valve 21 is opened. Further pressure fluid will then be delivered via the removal line 20 back into the master brake cylinder. Only in these rarely occurring cases will there result a feedback of the control on the master brake cylinder 1 and thus on the pedal. However, the design affords the advantage that the high-pressure accumulator can be furnished with a small absorptive volume so that the accumulator will not become too voluminous in size.

The brake slip control operation is terminated when the control unit determines by analysis of the sensor signals that the wheels do not have a tendency to lock. It is also terminated when the braking pressure is reduced via the non-return valves 12 by release of the pedal.

A traction slip control operation may be required, for instance when torque is supplied to the wheels which cannot be transmitted by way of the friction between tire and road surface, causing the wheels to tend to spin. The excessive torque can be compensated by braking pressure. Therefore, braking pressure is desired to be built up during traction slip control, irrespective of brake pedal actuation.

The wheel spinning tendency can be detected by the control unit by virtue of the wheel sensors. When this occurs, the pump 7 will be switched on, and the TSC-valve 13 closes. The pump takes in pressure fluid out of the supply reservoir 50 which is connected to the master brake cylinder 1 in a known fashion. This is possible because the separating valve 5 is open and the first suction valve 8 has but a low opening pressure. Furthermore, the pump 7 is designed to be of the self-priming type as referred to before. The pressure fluid taken in is delivered via the pressure valve 9 to the wheel brakes 3 to generate a braking pressure. This braking pressure can be modulated in the same way as in the case of brake slip control by opening and closing of the inlet and outlet valves. When sufficient pressure fluid is in the brake circuit, the high-pressure accumulator 19 will begin to be charged, and the separating valve 5 will be closed. Pressure loss through the non-return valves 12 cannot occur since the TSC-valve 13 is closed.

The traction slip control operation will be terminated as soon as the control unit determines that the spinning tendency of the driven wheels no longer exists.

I claim:

1. An automotive wheel brake system with brake controls for controlling both brake slip and traction slip of a wheel brake for a vehicle wheel comprising:
   a master brake cylinder;
   a brake line connecting said wheel brake to said master cylinder;
   a fluid pump having a pumping chamber and a suction side inlet connected to said pumping chamber and said master brake cylinder, a one way acting first suction valve connected between said inlet and said master cylinder allowing flow only into said pumping chamber, said pump also having a pressure side outlet connected to said pumping chamber and wheel brake;
   a separating valve in said brake line interposed between said master brake cylinder and said inlet of said pump;
   a high pressure accumulator connected to said pressure side outlet of said pump, and means closing said brake line separating valve when said high-pressure accumulator is partially charged;
   one way valve means allowing one way communication between said master cylinder and said wheel brake after closing of said separating valve;
   a brake shunt line associated with said wheel brake, placing said wheel brake in communication with said master brake cylinder in parallel with said brake line, which connects said wheel brake to said master cylinder;
   a normally open traction slip control valve in said shunt line closed by said brake controls whenever traction wheel slip occurs;
   a return line placing said wheel brake in communication with said pumping chamber;
   a second one way acting suction valve in said return line, said second suction valve having an opening pressure in excess of 1 bar to allow flow into said pumping chamber from said wheel brake;
   an inlet valve and outlet valve, each operated by said brake controls, said inlet valve arranged in said brake line, which connects said wheel brake to said master cylinder, and said outlet valve arranged in said return line.

2. A brake system as claimed in claim 1 wherein a pressure line communicates said outlet of said pump with said master cylinder, and further including a controllably openable non-return valve inserted into said pressure line which opens said pressure line when said high-pressure accumulator is fully charged.

3. A brake system as claimed in claim 1 wherein said pump is self-priming.

4. A brake system as claimed in claim 3 wherein said pump includes a reciprocal piston and wherein said piston of said pump is provided with two seals with an intermediate region between said seals, further including a low pressure accumulator in said return line, and a line connecting said low pressure accumulator with said intermediate region.

5. A brake system as claimed in claim 1 further including a non-return valve opening towards said master brake cylinder arranged in said shunt brake line leading to said wheel brake.

6. An automotive brake system having at least one wheel brake and a brake control preventing wheel slip during antislip operation, comprising:
   a pedal operated master cylinder;
   a brake line connecting said master cylinder to said wheel brake;
   a normally open inlet valve interposed in said brake line, closed by said brake control during antislip operation;
   a pump operated by said brake control during antislip operation, said pump having a pumping chamber interposed in said brake line to receive outflow from said master cylinder to said pumping chamber and an outlet from said pumping chamber connected to said wheel brake by said brake line, allowing pressurization of said wheel brake by said master cylinder or by operation of said pump;
   a first non-return valve connected to open only in the direction of flow from said master cylinder to said pumping chamber to normally isolate said master cylinder from said pumping chamber when said pump is activated;
   an inlet to said pumping chamber, a return line connecting said wheel brake and said pumping chamber inlet;
   a normally closed outlet valve interposed in said return line, opened by said brake control during antislip operation; and,
   a second non return valve interposed between said outlet valve and said pumping chamber allowing only suction flow thereinto from said wheel cylinder;
   a shunt return line connecting said wheel brake and said master cylinder in parallel to said brake line allowing return flow from said wheel brake to said master cylinder, and a non return valve in said shunt line opening towards said master cylinder.

7. The brake system according to claim 6 further including a separating valve in said brake line interposed between said master cylinder and said pumping chamber;

a high pressure accumulator connected to receive outflow from said pumping chamber; and, means closing said separating valve upon partial charging of said high pressure accumulator, a controllably openable non return valve connecting said master cylinder directly to said wheel brake via said brake line, said controllably openable non return valve allowing communication between said master cylinder and said wheel brake after closing of said separating valve.

8. The brake system according to claim 7 wherein said shunt line connecting said wheel brake and said master cylinder in parallel to said brake line has a one-way acting valve opening towards said master cylinder interposed therein.

9. The brake system according to claim 8 further including a traction slip control valve controlling opening of said shunt line, said traction slip control valve operated by said brake control during traction wheel slip conditions to close said shunt line to enable pressurizing said wheel brake by said pump, said pump drawing fluid through said first non return valve from said master cylinder.

10. The brake system according to claim 7 wherein said high pressure accumulator includes an accumulator spring having a force level preventing charging of said accumulator until a pressure is developed in said system in excess of that causing brake slip.

11. The brake system according to claim 6 further including a low pressure accumulator in said return line, which connects said wheel brake and said pumping chamber, also receiving fluid outflow from said wheel brake upon opening of said outlet valve.

12. The brake system according to claim 6 wherein said second non return valve opens at a pressure on the order of 1 bar.

* * * * *